United States Patent [19]

Lederman

[11] Patent Number: 4,497,523
[45] Date of Patent: Feb. 5, 1985

[54] MODULAR SUSPENSION STRUT BEARING

[75] Inventor: Frederick E. Lederman, Sandusky, Ohio

[73] Assignee: General Motors Corporation, Detroit, Mich.

[21] Appl. No.: 470,158

[22] Filed: Feb. 28, 1983

[51] Int. Cl.$^3$ .............. F16C 19/12; B60G 11/42
[52] U.S. Cl. .................. 384/613; 280/668; 280/673
[58] Field of Search ............ 280/668, 670, 673, 692, 280/696, 724; 308/184 R, 216, 219, 229, 227, 230, 231, 233, 235, 232

[56] References Cited

U.S. PATENT DOCUMENTS

| | | | |
|---|---|---|---|
| 4,120,542 | 10/1978 | Bhateja et al. | 308/235 X |
| 4,120,543 | 10/1978 | Greene, Jr. et al. | 308/233 |
| 4,210,343 | 7/1980 | Shiomi et al. | 280/668 |
| 4,229,055 | 10/1980 | Olschewski | 308/184 R |
| 4,248,454 | 2/1981 | Cotter et al. | 280/668 |
| 4,260,177 | 4/1981 | Pflughaupt et al. | 280/668 |
| 4,274,655 | 6/1981 | Lederman | 280/668 |

FOREIGN PATENT DOCUMENTS 3034743  4/1982  Fed. Rep. of Germany.

Primary Examiner—Stuart S. Levy
Assistant Examiner—David Werner
Attorney, Agent, or Firm—Patrick M. Griffin

[57] ABSTRACT

A unitized bearing assembly for a MacPherson suspension strut includes an inner bearing module enclosed within an outer housing module, the two modules structurally cooperating to support vehicle loads. In each of the three disclosed embodiments, the bearing module has upper and lower stamped bearing steel races providing two point angular contact raceways for a complement of balls. In two embodiments, the inner surfaces of upper and lower members of the housing module are designed to engage the outer surfaces of the bearing races along narrow annular surfaces defined by the angular contact lines of the races. When the housing members are compressed between the elastomer mount and spring seat of the suspension, they structurally cooperate with the races to support vehicle loads which the relatively thin races would not otherwise support. In a third embodiment, the lower housing member is formed of elastomer continuously molded over the outer surface of the lower race with a peripheral groove in its bottom surface which seats on the spring seat. Under vehicle load the groove partially fills as the elastomer compresses, but the continuous engagement through the angular contact lines is assured and the same structural cooperation results. In all embodiments axial retention means maintain housing and bearing modules together as a unit, the retention means being disengaged under vehicle load.

4 Claims, 5 Drawing Figures

MODULAR SUSPENSION STRUT BEARING

This invention relates generally to bearing assemblies for MacPherson struts and particularly to a modular bearing assembly interposed between the spring seat and resilient mount of a MacPherson strut.

BACKGROUND OF THE INVENTION

Front wheel drive vehicles frequently incorporate a MacPherson strut in the front suspension thereof. This strut includes a piston rod mounted at its upper end to a resilient mount on the vehicle body. A coil spring surrounds the piston rod and is seated between a lower spring seat and an upper spring seat located beneath an elastomer pad of the resilient mount. As the car is steered, the spring seats and the coil spring turn together relative to the piston rod and resilient mount. Therefore, it is desirable that there be an anti-friction bearing between the upper spring seat and the resilient mount for superior handling and feel.

The prior art discloses anti-friction bearings in a MacPherson strut.

Cotter et al U.S. Pat. No. 4,248,454 and Shiomi et al U.S. Pat. No. 4,210,343 disclose ground race type ball bearings in a MacPherson strut. German patent application DE No. 3034 743 discloses a ball bearing for a MacPherson strut. The races of the bearing are stamped into the spring seat and into a metal plate molded to the elastomer pad of the resilient mount. Both spring seat and plate would have to be of bearing steel, thick enough to support vehicle load. It would also be difficult to stamp a race of the required curvature into a spring seat. Greene et al U.S. Pat. No. 4,120,543 and Lederman U.S. Pat. No. 4,362,344 disclose modular bearing assemblies for MacPherson struts which have stamped angular contact races. The bearing races of these structures are of a thickness sufficient to support and transfer the imposed loads.

SUMMARY OF THE INVENTION

The present invention provides a modular bearing assembly interposed between the spring seat and the resilient mount of a MacPherson strut and including an inner bearing module enclosed with an outer housing module. The races of the inner bearing module are of thin steel stock insufficient alone to support and transfer the imposed loads and are therefore backed up by the respective members of the housing module to cooperatively support and transfer such loads.

The races of the bearing module are of stamped steel and provide opposed four point angular contact raceways and adjacent sealing surfaces. The raceways receive a complement of balls. The outer sides of the races are backed up by the housing module. The material of the races is of insufficient thickness by itself to transfer and support the imposed loads.

The housing module includes upper and lower members, each of which has an inner surface respective to an outer surface of a bearing module race, and an outer surface. The outer surface of the upper housing member is joinable to the elastomer pad of the resilient mount while the outer surface of lower housing member is closely seated on the upper spring seat.

The inner surface of the upper housing member and the outer surface of the upper race are shaped to engage each other at the same or nearly the same contact angle as the balls within the raceways. This contact is maintained under imposed vehicle loads so that the race and member cooperatively resist imposed loads. These surfaces are free of contact elsewhere, although the separation is very slight.

A similar cooperation exists between the lower race and lower housing member. In one embodiment, the inner surface of the lower housing member, which is of hard nylon or similar material, is shaped to conform to the outer surface of the lower race in identical fashion to the conformance of the upper housing member and upper race described above. The outer surface of the lower housing member is shaped to seat closely on the spring seat.

In another embodiment, the lower housing member is formed of an elastomer material, and its inner surface is directly bonded to the outer surface of the lower race. The outer surface of the lower housing member has, in the unloaded condition, a trough or groove circumferentially formed therein centrally between those points where imaginary lines joining the contact points of the balls would intersect the upper spring seat. Thus, under imposed loads, the lower housing member is compressed, and the trough or groove is flattened out, but continuous contact is maintained between the lower housing member and spring seat at the angular contact points.

In addition, each embodiment includes axial retention means which retains at least one of the housing members and the bearing module together as a unit when removed from the vehicle. The retention means is nonengaged under imposed loads and does not conflict with operation of the bearing.

It is, therefore, an object of the invention to provide a modular bearing assembly for vehicle suspensions which includes a bearing module having races of thin wall construction which are cooperable with members of a housing module to support and transfer vehicle loads imposed thereon.

It is yet another object of the invention to provide such a modular bearing assembly in which the bearing module is of the angular contact type and at least one of the races is structurally reinforced by a similarly shaped member of the housing module.

It is a further feature of the invention to provide such a modular bearing assembly in which retention means are cooperable between the housing module and bearing module to retain the assembly together as a unit when removed from vehicle.

BRIEF DESCRIPTION OF THE DRAWINGS

These and other objects of the invention will appear from the following written description and drawings in which.

DESCRIPTION OF THE PREFERRED EMBODIMENT

Figure 1:
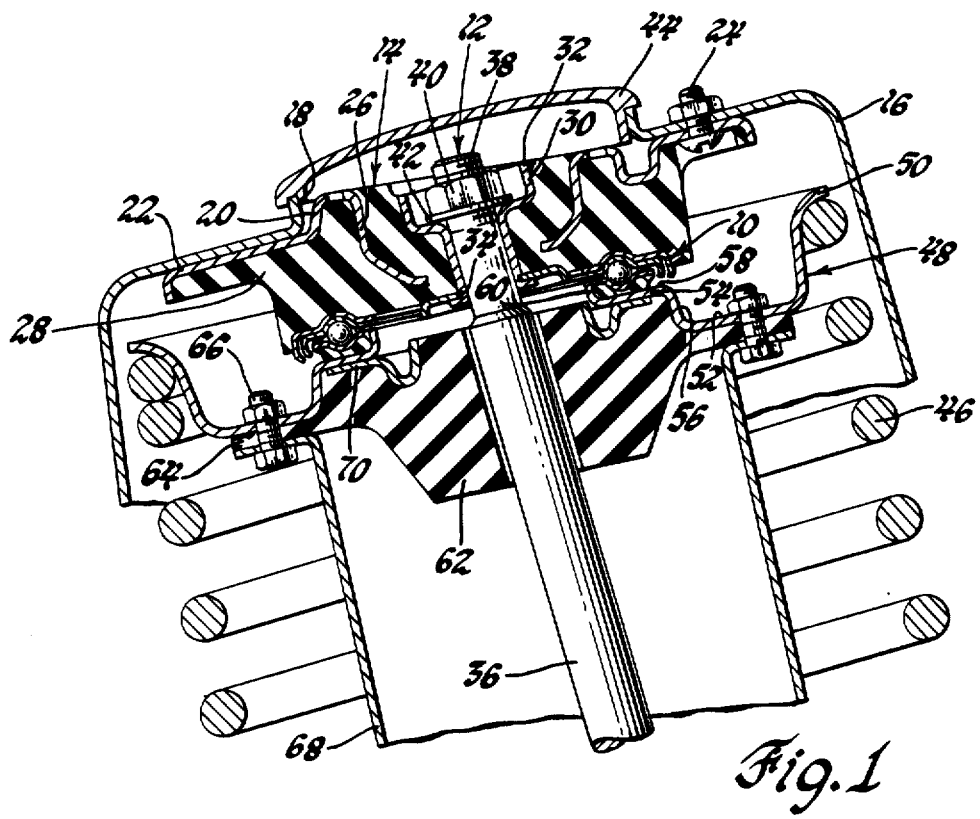
FIG. 1 is a sectional view of the top portion of a vehicle suspension incorporating a first embodiment of the bearing assembly.

Referring first to FIG. 1, a first embodiment of the modular bearing assembly of the invention designated generally at 10 is shown associated with the upper part of a vehicle front suspension designated generally at 12. The upper part of the suspension 12 is rigidly held with respect to a vehicle attached resilient mount designated generally at 14, the details of which will be described below, while the other part of suspension 12 turns with the vehicle steering system and rotates relative to resilient mount 14. Bearing assembly 10 is rotatably interposed between the relatively rotatable parts of the suspension.

Still referring to FIG. 1, a sheet metal tower like structure 16, which is part of the vehicle wheel well, includes an aperture 18 at the top thereof within which resilient mount 14 is attached. Resilient mount 14 includes a generally annular stamped mounting plate 20 which has a flat outer flange 22 joined to the top of tower 16 by nut and bolt assemblies, one of which is visible at 24. Mounting plate 20 includes a cup-shaped portion 26 integral with flange 22 and molded into an elastomer pad 28 which is also bonded to the bottom of flange 22. Pad 28 has a metal sleeve 30 molded through the center thereof which has a flared upper end 32 and a generally annular retention plate 34 joined to the lower end thereof and engaging the bottom surface of pad 28. The elastomer of pad 28, as well as the shape of cup portion 26, is chosen to provide the desired spring rate and resiliency characteristics for the vehicle involved, and further details thereof may be found in Lederman U.S. Pat. No. 4,274,655 assigned to the assignee of the present application.

The lower portion of front suspension system 12, not shown, includes a piston type damper with a cylindrical reservoir, the lower end of which is connected to the steering knuckle of the vehicle wheel. A piston rod 36 extends out of the cylindrical casing and includes a necked-down upper end 38 which is received through sleeve 30 and is rigidly held thereto by nut 40 and washer 42 seated on flared upper end 32 of sleeve 30. Aperture 18 is then closed by a cap 44 to keep out foreign materials. The cylindrical casing of the damper includes a lower spring seat, not shown. A shock absorbing coil spring 46 surrounding piston rod 36 is seated against the lower spring seat and also against an upper spring seat designated generally at 48. As the vehicle is steered, the cylindrical casing, lower spring seat, coil spring 46 and upper spring seat 48 rotate relative to the piston rod 36, through the bearing assembly 10, the details of which are described below.

Upper spring seat 48 includes a flared outer skirt 50 which seats the upper coil of spring 46. Seat 48 further includes a lower annular portion 52 which is connected to an upper annular portion 54 by a generally cylindrical wall 56. Upper annular portion 54 has a generally flat upper surface 58, and terminates in an innermost, generally vertical, cylindrical flange 60. An apertured rubber jounce bumper 62 surrounds the piston rod 36 and is attached by integral tabs 64 and nut and bolt assemblies 66 to lower annular portion 52. A cylindrical splash shield 68 is also attached to tabs 64 by the same assemblies 66. A metal contact plate 70 molded to the top of jounce bumper 62 is engaged with the lower surface of upper annular portion 54. Jounce bumper 62 is designed to isolate resilient mount 14 from engagement with the cylindrical casing of the damper under severe jounce conditions.

Figure 2:
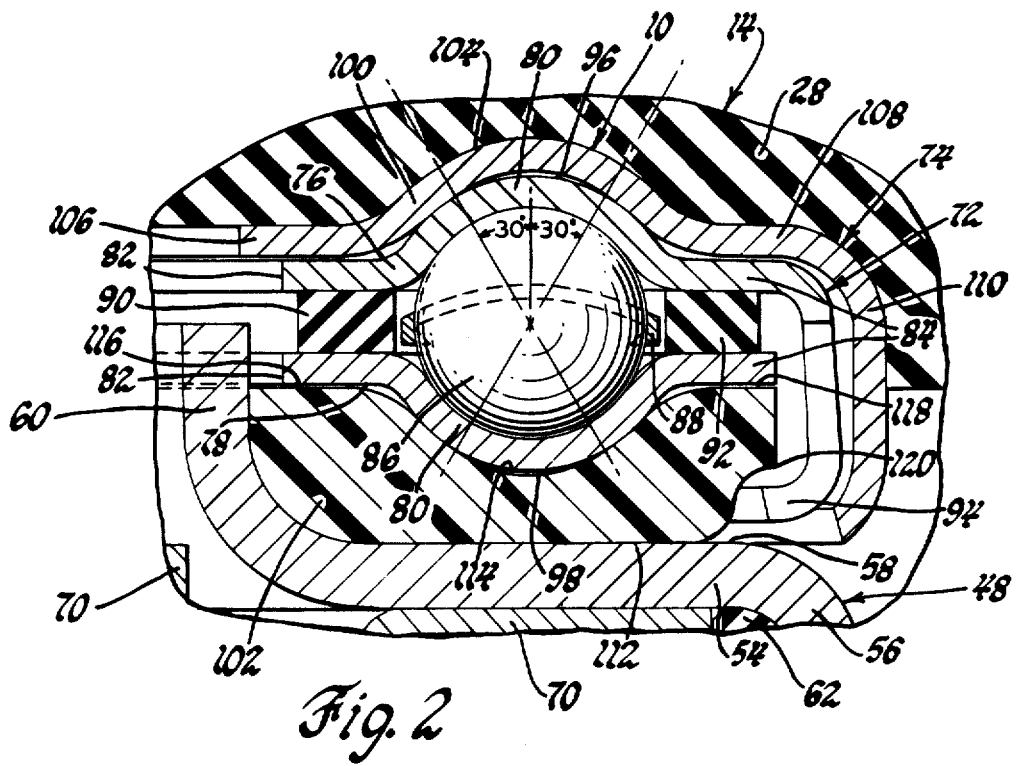
FIG. 2 is an enlarged view of a portion of FIG. 1.

Referring now to FIG. 2, the details of bearing assembly 10 may be seen. In general, a bearing module designated generally at 72 is enclosed within a housing module designated generally at 74 which is, in turn, enclosed between the resilient mount 14 and the upper spring seat 48 of the suspension 12. Bearing module 72 includes annular upper and lower races 76 and 78, each having an annular central raceway 80 and annular inner and outer flanges 82 and 84 respectively. The raceways 80 receive a complement of balls 86. The raceways, sometimes known as gothic arch raceways, are engaged by the balls at a 30° angle of contact to either side of the vertical and have a curvature of 56%. While each ball 86 contacts each raceway 80 at only two points, the raceway curvature is too small to show in the drawing, although the angle of contact is shown in dash lines which are extended into the housing module 74. Balls 86 are caged by a standard separator 88, and the opposed inner surfaces of flanges 82 and 84 provide sealing surfaces closed by concentric elastomer rings 90 and 92. Flange 84 of upper race 76 includes a circumferentially spaced series of axially depending, resilient integral fingers 94 of shallow C-shaped cross-section, the purpose for which will be described below. Since races 76 and 78 are of relatively thin wall construction, the respective outer surfaces 96 and 98 of raceways 80 closely conform to the inside surfaces thereof. A minimum thickness of bearing quality steel is used for races 76 and 78 which, thereof, cannot support the loads imposed on the bearing races by balls 86.

Housing module 74 includes an upper housing member 100 and a lower housing member 102. Upper housing member 100 is a sheet metal stamping of nonbearing quality steel which is shaped generally similar to the shape of upper race member 76, including an annular central arch portion 104 and inner and outer annular flanges 106 and 108. The inside surface of central arch portion 104 is shaped to conform to the outer surface of raceway 80 and engages the outer surface along lines or narrow annular areas defined at or about all those points where the angular contact lines of balls 86 intersect raceway 80 and arch portion 104. The inside surfaces of flanges 106 and 108 are spaced from the outside surfaces of flanges 82 and 84. This spacing is greatest in the unloaded condition. The spacing is exaggerated in FIG. 2 for purposes of illustration. The outer flange 108 additionally includes an integral axially depending resilient cylindrical flange 110 having a shallow C-shaped cross-section similar to resilient fingers 94. The outer surfaces of central arch portion 104 and of the flanges 106 and 108 are bonded to the elastomer pad 28 concentric to sleeve 30.

The lower housing member 102 is formed of nylon or similar material and includes an outer surface 112 which is shaped to closely seat on substantially the entire area of surface 58 and against cylindrical flange 60 of upper spring seat 48. This gives a continuous contact as opposed to the line contacts of surface 96 and the inner surface of central arch portion 104. The inside of lower housing member 102, has a central trough shaped portion 114 bounded by inner and outer annular surfaces 116 and 118 which are spaced from the outer surfaces of flanges 82 and 84 of lower race 78. The surface of trough shaped portion 114 engages the outer surface 98 of the raceway 80 of lower race 78 along the same contact lines as described above in conjunction with surface 96 and arch portion 104. These contact lines between bearing module 72 and housing module 74 are maintained under load since the axial separations described are sufficient to prevent any other contact. Thus, a continuous and cooperative contact from ball to race member to housing member is maintained and, effectively, a structural unit of sufficient strength to resist the loads is formed by this coaction, although the bearing steel in race module 72 is in and of itself insufficient to support the imposed loads.

Housing member 102 includes an annular shoulder 120 and on the radial outermost side thereof. The axially depending fingers 94 of upper race 76 resiliently snap fit over shoulder 120. Fingers 94 also snap fit within flange 110 of upper housing member 100 which has a slightly larger diameter.

Shoulder 120, fingers 94 and flange 110 are axially disengaged under load, allowing races 76 and 78 to turn freely. Thus, the bearing module 72 may be separately assembled and its accuracy maintained by a bearing manufacturer, while upper housing 100 and its molding to elastomer pad 28 may be controlled by the manufacture of resilient mount 14 and the two subassemblies easily joined later.

Figure 3:
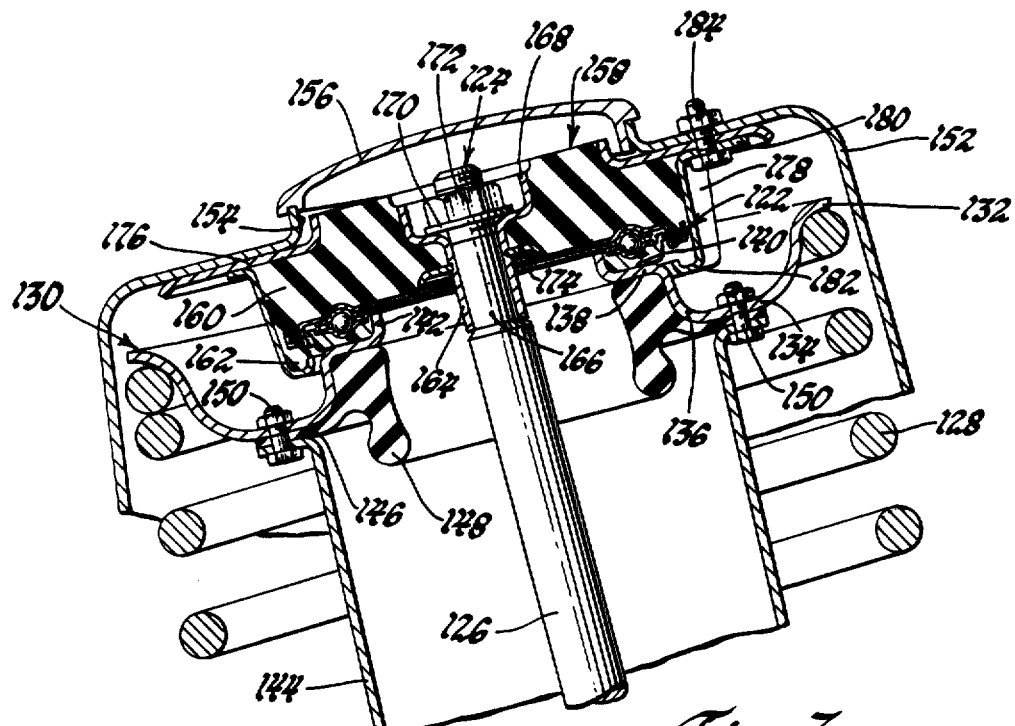
FIG. 3 is a view similar to FIG. 1 of another embodiment of the bearing assembly.
Figure 4:
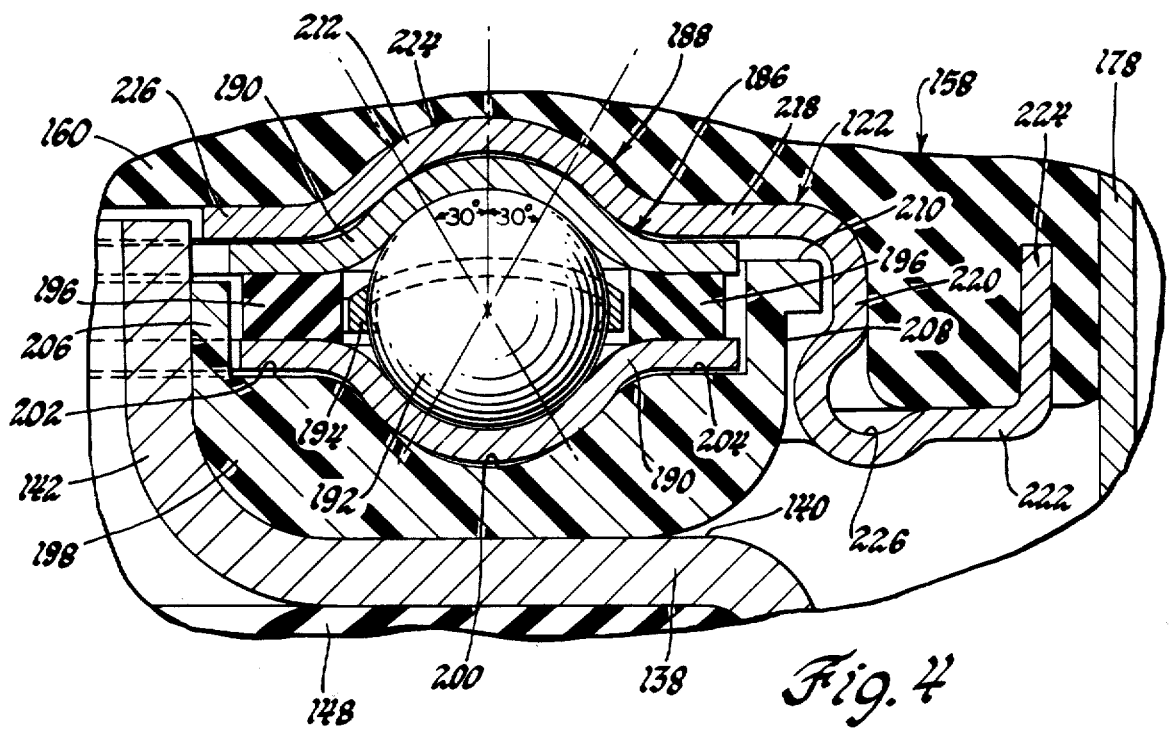
FIG. 4 is a view of a portion of FIG. 3.

The second embodiment 122 of the invention shown in FIGS. 3 and 4 is substantially similar to that shown in FIGS. 1 and 2, the main difference being that the upper housing member is also included as part of the separable unit which is attached to the resilient mount all at once, as opposed to the upper housing member being separately molded into the mount.

Referring to FIG. 3, suspension 124 is essentially identical to suspension 12 of the first embodiment, with the same piston damper, lower spring seat, and attachment to the steering knuckle of the vehicle, not shown. A piston rod 126 is surrounded by a coil spring 128. An upper spring seat 130 includes a flared outer skirt 132 which seats the top coil of spring 128, and a lower annular portion 134 which is joined across cylindrical wall 136 to an upper annular portion 138 which has a substantially flat upper surface 140 and terminates in a generally vertical cylindrical flange 142. A cylindrical splash shield 144 and the flange 146 of an apertured jounce bumper 148 are joined to lower annular portion 134 by nut and bolt assemblies 150, just as in the previous embodiment. Jounce bumper 148 is slightly different than bumper 62 but performs the same function.

A sheet metal tower 152 has an aperture 154 closed by cap 156. A resilient mount 158 includes an elastomer pad 160 of a generally annular shape with a series of collapsed integral depending fingers 162 around the outer circumference of the bottom surface, one of which is visible in FIG. 3. Fingers 162 would extend axially downwardly further in their free state. A cylindrical metal sleeve 164 is bonded through the center of pad 160 and fits over a necked down portion 166 of piston rod 126. Sleeve 164 includes a flared upper end 168 upon which a washer 170 and nut 172 are seated to rigidly hold resilient mount 158 to rod 126. A retention plate 174 is joined to sleeve 164 and biased against the bottom surface of pad 160. Resilient mount 158 is joined to tower 152 by an upper annular retainer 176 and a cup-shaped lower retainer 178 which has three integral tabs 180 at the top thereof and an up turned circumferential flange 182 at the bottom thereof. Pad 160 is loaded between retainers 176 and 178 and secured to tower 152 by suitable fasteners, such as nut and bolt assemblies 184 received through aligned openings passing through tower 152, tabs 180 and upper retainer 176. This serves to preload pad 160, as well as collapse fingers 162 to retain bearing 122 which will be next described.

A bearing module 186 is enclosed by a housing module 188 which is, in turn, interposed between elastomer pad 160 and upper spring seat 130. Bearing module 186 is nearly identical to bearing module 72 except that its upper and lower races 190 are both identical to lower race 78 of the first embodiment. Thus, bearing module 186 is symmetrical. Balls 192, separator 194 and rings 196 are all identical to the equivalent parts in bearing module 72. The inside of lower housing member 198 includes a central trough shaped portion 200 bounded by inner and outer annular surfaces 202 and 204 which are equivalent to portion 98 and surfaces 116 and 118 of lower housing member 102. The outer surface of lower housing member 198 seats on the upper annular surface 140 and cylindrical flange 142 as in the previous embodiment. The lower housing member 198 includes a vertical cylindrical wall 206 extending upwardly adjacent inner annular surface 202 and a similar vertical cylindrical wall 208 extending upwardly adjacent outer annular surface 204 and terminating in a circumferential shoulder 210.

Upper housing member 212 includes a central arch portion 214 and inner and outer flanges 216 and 218. Upper housing member 212 further includes an axially depending cylindrical flange 220 integral with an annular flange 222 which terminates in an upturned lip 224. At circumferentially spaced locations on the shoulder between flanges 220 and 222 are formed a series of approximately eight stamped dimples 226. After bearing module 186 is located between lower housing member 198 and upper housing member 212, dimples 226 are snapped past shoulder 210 to releasably secure the housing members to each other.

The housing module 188 is generally a sealed unit due to the cooperation of wall 206 and flange 216 and wall 208 and flange 220. The lower surface of the elastomer pad 160 may be molded with a contour similar to the outer surface of upper housing member 212. The fingers 162 are collapsed under horizontal flange 222 by lip 182 as elastomeric pad 160 is preloaded between upper and lower retainers 176 to releasably retain module 188 to pad 160. Thus all members of the second embodiment 122 may be separately manufactured and assembled later. Upper housing member 212 may also be formed of non-bearing quality steel, and the structural support between the members is the same as in the previous embodiment.

Figure 5:
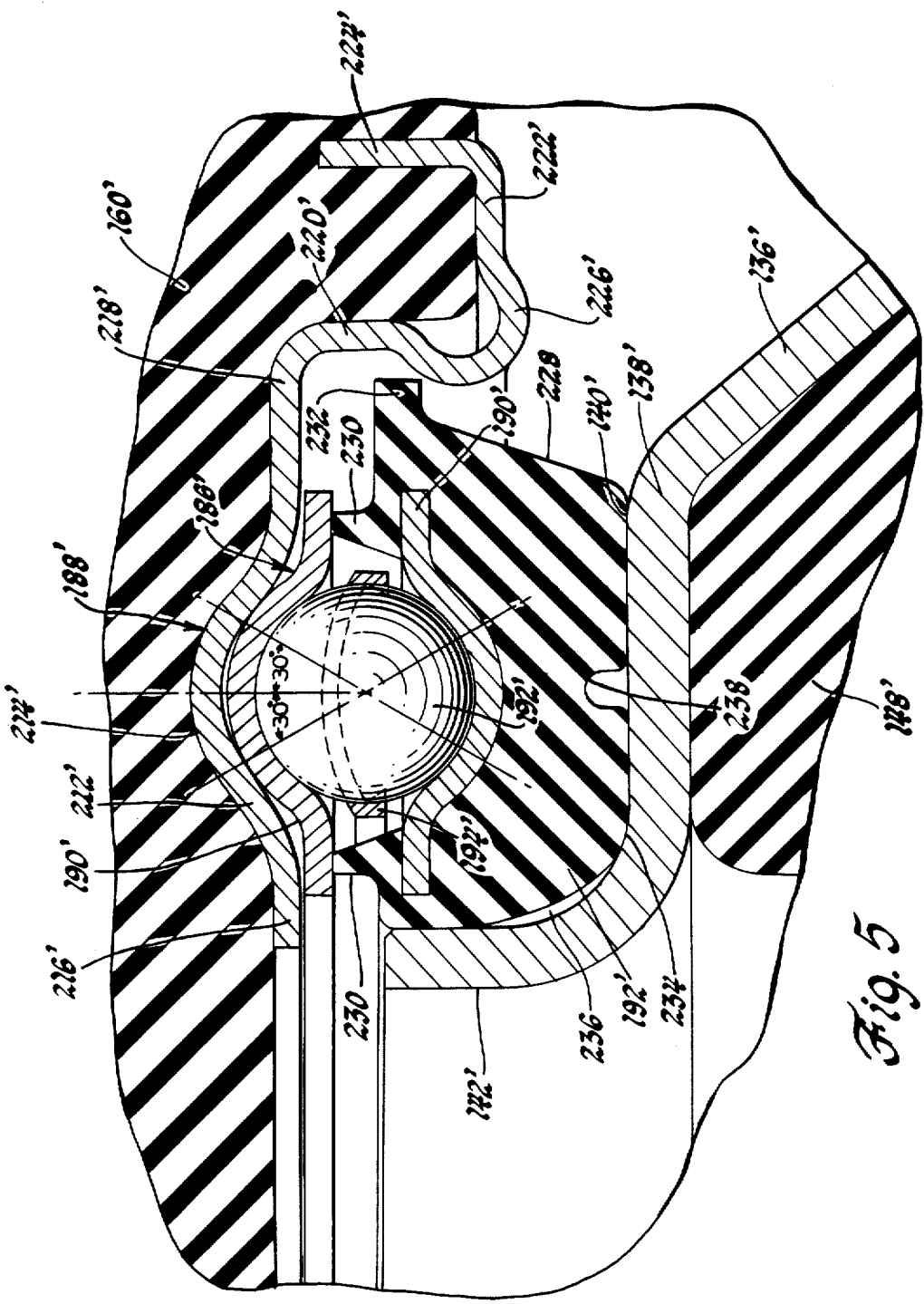
FIG. 5 is an enlarged view of a portion of another embodiment of the bearing assembly.

FIG. 5 shows an embodiment which is a variant of the embodiment in FIG. 4. Accordingly, like structural elements are given the same numbers with a prime. In this embodiment, the lower housing member 228 is formed of elastomeric material rather than hard nylon, and is molded around the entire outer surface of lower race 190' to form a pair of sealing lips 230. Lower housing member 228 further includes a resilient circumferential shoulder 232 similar to shoulder 210 and which snaps past dimples 226' to create a unit as in the previous embodiment. The outer surface 234 of lower housing member 228 engages the upper surface 140' of annular portion 138' at the points where the angular contact lines intersect it, as well as along the inside of flange 142'. In the unloaded condition, a gap or spacing 236 exists between annular portion 138' and flange 142' and a circumferentially extending groove 238 is open.

Under load, groove 238 will partially close as the elastomer of lower housing member 228 is compressed and the gap 236 will lessen. However, the engagement of race-elastomer housing member-spring seat at the angular contact points will remain continuous and the same structural cooperation to create a unit of sufficient strength to support the loads as in the previous embodiments will result.

Thus several embodiments of a modular MacPherson strut bearing have been disclosed in which a separable bearing assembly made up of bearing members using a minimum of bearing steel enclosed by housing members which unitize the assembly and are designed to fit between the resilient mount and spring seat of a suspension structurally cooperate to form a unit of sufficient strength to resist the vehicle load.

The embodiments of the invention in which an exclusive property or privilege is claimed are defined as follows:

1. A modular bearing assembly providing a rotatable support and transferring loads between two relatively rotatable parts of a vehicle suspension, comprising,
    a bearing including upper and lower races providing opposed raceways on the inner surfaces thereof for a complement of rolling antifriction elements, said raceways and rolling antifriction elements engaging one another so as to transfer imposed loads through said elements and through said races to selected portions of the outer surfaces thereof covering less than said entire outer surfaces, said races being formed of a relatively thin material of insufficient strength to solely support the imposed loads transferred to said selected portions,
    a housing module enclosing and cooperatively strengthening the bearing module, including an upper and lower housing member each having an outer surface movable with one of said relatively rotatable parts of the suspension and each having an inner surface shaped to conform to the outer surfaces of said respective upper and lower races so as to transfer imposed loads only to said selected portions of the outer surfaces of said races so as to coact therewith to structurally reinforce said races to provide a structural unit of sufficient strength to resist the loads only at said selected portions, whereby the structural cooperation between the races and housing members provides bearing assembly with races of minimal thickness which is capable of resisting vehicle loads.

2. A modular bearing assembly providing a rotatable load transferring support between two relatively rotatable members of a steerable wheel suspension, comprising,
    an enclosed race module including upper and lower races providing opposed angular contact raceways on the inner surfaces thereof for a complement of spherical antifriction elements, said races being of a relatively thin wall construction of insufficient strength to solely resist the vehicle load,
    a housing module enclosing and cooperatively strengthening the race module, including an upper housing member having an inner surface shaped to engage the outer surface of the upper race continuously only along narrow annular areas defined about all the points where lines through the contact angles of the raceways intersect said surfaces, said engagement being maintained under load to structurally reinforce the upper race to provide a structural unit of sufficient strength to resist the vehicle load, the upper housing further having an outer surface mounted to one of the relatively rotatable members of the suspension,
    the housing module further including a lower housing member having an inner surface and an outer surface, the inner surface being shaped to engage the outer surface of the lower race only along the narrow annular areas defined similarly to the areas of engagement between the upper race and upper housing member, said engagement being maintained under load to structurally reinforce the lower race to provide a structural unit of sufficient strength to resist vehicle load, and the outer surface of the lower housing member being mounted to the other relatively rotatable member of the suspension whereby the structural cooperation between the races and housing members provides a bearing assembly with races of minimal thickness which is capable of resisting vehicle loads.

3. A modular bearing assembly providing a rotatable support between a vehicle mounted elastomer pad and a relatively rotatable spring seat of a steerable wheel suspension, comprising,
    an enclosed race module including upper and lower races providing opposed angular contact raceways on the inner surfaces thereof for a complement of spherical antifriction elements, said races being of a relatively thin wall construction of insufficient strength to solely resist the vehicle load,
    a housing module enclosing and cooperatively strengthening the race module, including an upper housing member having an inner surface shaped to engage the outer surface of the upper race continuously only along narrow annular areas defined about all the points where lines through the contact angles of the raceways intersect said surfaces, said engagement being maintained under load to structurally reinforce the upper race to provide a structural unit of sufficient strength to resist the vehicle load, the upper housing further having an outer surface joinable to the elastomer pad,
    the housing module further including a lower housing member having an inner surface and an outer surface, the inner surface being shaped to engage the outer surface of the lower race only along the narrow annular areas defined similarly to the areas of engagement between the upper race and upper housing member, said engagement being maintained under load to structurally reinforce the lower race to provide a structural unit of sufficient strength to resist vehicle load, the outer surface of the lower housing member being shaped to engage a surface of the spring seat continuously over an area thereof, whereby the structural cooperation between the races and housing members provides a bearing assembly with races of minimal thickness which is capable of resisting vehicle loads.

4. A modular bearing assembly providing a rotatable support between a vehicle mounted elastomer pad and a relatively rotatable spring seat of a steerable wheel suspension, comprising,
    an enclosed race module including upper and lower races providing opposed angular contact raceways on the inner surfaces thereof for a complement of spherical antifriction elements, said races being of a relatively thin wall construction of insufficient strength to solely resist the vehicle load,
    a housing module enclosing and cooperatively strengthening the race module, including an upper housing member having an inner surface shaped to engage the outer surface of the upper race continuously only along narrow annular areas defined about all the points where lines through the contact angles of the raceways intersect said surfaces, said engagement being maintained under load to structurally reinforce the upper race to provide a structural unit of sufficient strength to resist the vehicle load, the upper housing further having an outer surface joinable to the elastomer pad, the housing module further including a lower housing member having an inner surface and an outer surface, the inner surface of the lower housing member being continuously molded to the outer surface of the lower race, with the outer surface being shaped to engage a surface of the spring seat only along annular areas defined by the intersection of lines through the contact angles of the races with the outer surface and the spring seat, said engagement being maintained under load to structurally reinforce the lower race to provide a structural unit of sufficient strength to resist vehicle load, whereby the structural cooperation between the races and housing members provides a bearing assembly with races of minimal thickness which is capable of resisting vehicle loads.

* * * * *